United States Patent
Hu et al.

(10) Patent No.: US 7,847,431 B2
(45) Date of Patent: Dec. 7, 2010

(54) METHOD AND SYSTEM FOR ELECTRICAL POWER GENERATION

(75) Inventors: Lihua Hu, Rugby (GB); David R Trainer, Derby (GB); Stephen A Long, Carmel, IN (US)

(73) Assignee: Rolls-Royce plc, London (GB)

( * ) Notice: Subject to any disclaimer, the term of this patent is extended or adjusted under 35 U.S.C. 154(b) by 32 days.

(21) Appl. No.: 12/382,391

(22) Filed: Mar. 16, 2009

(65) Prior Publication Data
US 2010/0038969 A1 Feb. 18, 2010

(30) Foreign Application Priority Data
Apr. 10, 2008 (GB) ................... 0806491.7

(51) Int. Cl.
*H02J 3/38* (2006.01)
*H02J 3/46* (2006.01)
(52) U.S. Cl. .................. 307/44; 307/84; 307/9.1
(58) Field of Classification Search .......... 307/9.1, 307/44, 84
See application file for complete search history.

(56) References Cited

U.S. PATENT DOCUMENTS

| | | | |
|---|---|---|---|
| 4,044,296 A * | 8/1977 | Dhyanchand et al. | 322/25 |
| 4,649,327 A * | 3/1987 | Ishii | 388/821 |
| 4,829,228 A | 5/1989 | Buetemeister | |
| 5,747,978 A * | 5/1998 | Gariboldi et al. | 323/313 |
| 6,777,822 B1 * | 8/2004 | Suttie et al. | 290/40 A |
| 6,801,019 B2 * | 10/2004 | Haydock et al. | 322/17 |
| 7,521,901 B2 * | 4/2009 | Trainer et al. | 322/10 |
| 7,573,243 B2 * | 8/2009 | Trainer et al. | 322/24 |

FOREIGN PATENT DOCUMENTS
GB 2 435 529 8/2007

\* cited by examiner

*Primary Examiner*—Jared Fureman
*Assistant Examiner*—Adi Amrany
(74) *Attorney, Agent, or Firm*—Oliff & Berridge, PLC

(57) ABSTRACT

Electrical power generation systems typically comprise an electrical power distribution arrangement in which a number of electrical power generators are coupled in parallel. In such circumstances in order to avoid conflict generally a first electrical power generator is controlled with a voltage controller while second electrical power generators have electrical current controllers. As loads are switched into and out of the electrical distribution system in normal operation the first electrical power generator and its voltage controller can accommodate voltage dynamics and therefore maintain a desired voltage. However, in order to accommodate heavier loads switching, the dynamic operation of the electrical current controller is achieved through utilizing operational voltage margins from a desired voltage as control signals to the electrical current controller. A threshold is provided above which the electrical voltage margin must operate and regimes are provided to determine continued increase or fall in the operational voltage to allow continued dynamic control of the electrical current in order that voltage stability can be re-established with regard to electrical power distribution arrangements.

14 Claims, 5 Drawing Sheets

METHOD AND SYSTEM FOR ELECTRICAL POWER GENERATION

BACKGROUND OF THE INVENTION

1. Field of the Invention

The present invention relates to electrical power generation systems and methods of operating electrical power generation systems in which a plurality of electrical power generators are arranged on a common electrical distribution arrangement.

2. Description of Related Art

Electrical distribution arrangements are known in which a number of electrical generators are provided and which supply a common electrical power network. This electrical power network may be associated with a number of loads such that variations in voltage and/or current must be accommodated in order to meet minimum or desirable electrical generator system levels. With regard to aero engines it is known to provide generators which are embedded within the engine in order to provide electrical power for local engine control loads as well as other electrical demands within an aircraft incorporating the aero engines. Each engine in the aircraft may incorporate its own generators and therefore a number of generators are provided or coupled to a common distribution arrangement. Parallel operation of the generators can bring benefits in terms of system efficiency, weight and availability of electrical power throughout the network. In order to achieve parallel operation of the generators a suitable control method is required such that conflicts in control of each generator do not occur. Normally it is required that one of the generators operates with voltage control and the other generators operate with current control.

Referring to the illustration marked FIG. 5, it will be noted that steady operation is illustrated by point 1 where there is a stable voltage Vcmd and a stable electrical current Icmd. In order to provide such stability as indicated above, one electrical generator is designated to be under the dynamics of voltage control. In such circumstances a comparator 2 compares the desired voltage of Vcmd with the output voltage Vout from the voltage controller and generator 3. If the voltage output Vout does not equal Vcmd then through appropriate configuration of the associated generator dynamic adjustment is made until there is parity. Other generators provide an electrical current Icmd which again is compared with the output current Iout in a comparator 4. Any disparity is adjusted through reconfiguration using an electrical current controller and an electrical power generator 5 in order to achieve parity between Icmd and Iout. In such circumstances the steady state point 1 depicted graphically should be maintained. It will be understood that different electrical current controlled generators may have different values of Icmd.

Voltage control and electrical current control are normally independent controls. Both controls may be implemented on the same generator but they will not be active at the same time. A generator operating under voltage control is responsible for controlling electrical system dynamics whereas a generator operating under electrical current control does not provide any dynamic support to the generator that is controlling the generator system voltage.

It will be appreciated that an electrical generator or generators under electrical current control will at least attempt to maintain its electrical current output at the demand level at all times. The electrical current demand is normally provided from a higher level of system control which monitors, or predicts the total load level in the system and then decides the current demand for each generator under current control. Based upon this principle, the electrical current demand is relatively slow changing and hence, the electrical current control has a relatively slow response time. In such circumstances it is not possible for full system dynamics to be fulfilled with traditional electrical current control regimes. Electrical generators under electrical current demand controls will not respond to any system dynamics. Nevertheless, with regard to some electrical distribution systems relatively heavy electrical loads will result in highly dynamic scenarios with regard to the electrical power generation system. For example within an aeroplane there may be regenerative electrical surface actuators. When a surface actuator is activated it will draw a dynamically changing electrical current. As the load is stopped, the energy stored in the mechanical system will be released back into the power system as regenerated energy. Due to this variability it is difficult for a controller to predict electrical load and electrical demand and therefore dynamic loads such as actuators will always pose generator system instabilities.

As indicated above generally voltage controlled generators will normally operate within stability margins up to a limit of load changes that can be managed before unacceptable voltage dynamics occur. When a heavy actuator load is switched into a power generation system or particularly a power distribution arrangement, the dynamics imposed can be too fast and too severe for the voltage controlled generator to maintain the system voltage within acceptable levels. In such circumstances unacceptable system operation is provided.

A further problem associated with established electrical current control techniques is that unpredictable over voltages may occur through disconnection from parallel operation with the electrical generator controlled by voltage. When system connection between the voltage control generator and the current control generator is lost, as a result of a fault or malfunction, the part of the load that is still connected with the current controlled electrical generator may be smaller than the generator output current rating. Such a situation will cause the voltage within this part of the system to rise when the same electrical current level is pushed through the lower rating load. In such circumstances an over voltage protection function is required whilst conversely an under voltage may occur with heavy load conditions which would cause an immediate shutdown of the electrical voltage generator.

BRIEF SUMMARY OF THE INVENTION

In accordance with aspects of the present invention there is provided a method of operating an electrical generator system comprising a first electrical generator, a voltage controller, a second electrical generator, a current controller and a common electrical power distribution arrangement, the first electrical generator and the second electrical generator being coupled to the common electrical power distribution arrangement, the method comprising:

a) determining an operational voltage value for the common electrical power distribution arrangement;

b) comparing the operational voltage value with a desired voltage value to determine an operational voltage margin;

c) using the voltage controller to configure the first electrical generator to provide and substantially maintain the desired voltage value within the common electrical power distribution arrangement; and, d) comparing the operational voltage margin with a predetermined voltage margin whereby if the operational voltage margin exceeds the predetermined voltage margin then the current controller for the second electrical generator providing additional electrical current to the common electrical power distribution arrangement.

Also in accordance with aspects of the present invention there is provided an electrical generator system comprising a first electrical generator, a voltage controller, a second electrical generator, a current controller and a common electrical power distribution arrangement, the first electrical generator and the second electrical generator being coupled to the common electrical power distribution arrangement, the first electrical generator is associated with the voltage controller, a voltage sensor to determine a voltage across the common electrical power distribution arrangement and to provide an operational voltage value, a comparator to compare the operational voltage value with a desired voltage value to determine an operational voltage margin, the voltage controller configuring the first electrical generator to provide and maintain a desired voltage value within the common electrical power distribution arrangement, the second electrical generator associated with the current controller is used to maintain a desired electrical current value within the common electrical power distribution arrangement, a second comparator to compare the operational voltage margin with a predetermined voltage margin whereby if the second comparator determines that the operational voltage margin exceeds the predetermined voltage margin then the current controller for the second electrical generator being arranged to provide additional electrical current to the common electrical power distribution arrangement.

Preferably, the predetermined voltage margin is adjustable.

Possibly, there are a plurality of predetermined voltage margins to alter the additional electrical current provided by the second generator.

Possibly, additional electrical current is gradually altered, either increased or decreased until the operational voltage substantially equals the desired voltage.

Typically, there are a plurality of second electrical generators principally controlled by a respective current controller with each current controller associated with the voltage sensor.

Typically, the method includes determining whether the operational voltage margin is increasing or decreasing when greater than the pre-determined voltage margin.

The electrical generator system may be incorporated in a gas turbine engine and/or in an aircraft.

BRIEF DESCRIPTION OF THE DRAWINGS

Aspects of the present invention will now be described by way of example and with reference to the accompanying drawings in which.

DETAILED DESCRIPTION OF THE INVENTION

As indicated above stability is important with regard to maintaining electrical voltage within an electrical power generation system. In such circumstances, and in order to avoid conflicts, generally one generator is designated as the voltage control generator with other generators operating to maintain electrical current. The one generator designated the voltage controlled generator acts to maintain stability within the electrical generator system. In such circumstances this first voltage controlled electrical generator is generally the largest or most capable generator within the electrical power generation system. It may be that each electrical power generator has the capability of being the voltage control generator but nevertheless at any one instant one electrical power generator will be designated the voltage generator and the other generators simply contribute electrical current for load purposes. However, where there are significant or rapid changes in electrical load it may be that the voltage controlled electrical generator has insufficient capacity to maintain stability within acceptable levels or time periods.

Figure 1:
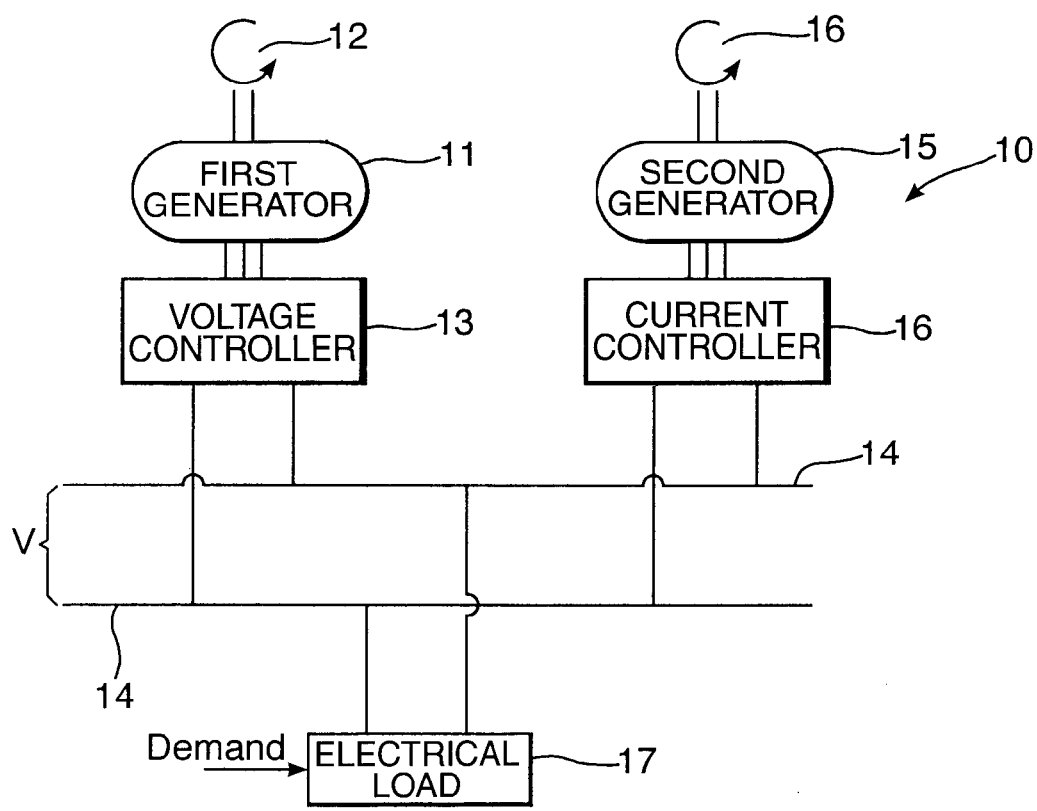
FIG. 1 is a schematic illustration of an electrical power generator system in accordance with aspects of the present invention.

FIG. 1 provides a schematic illustration of a typical electrical power generation system 10 in which a first electrical power generator 11 is typically driven by a turbine 12 with a voltage controller 13 in order to maintain a voltage V upon an electrical power distribution system 14, that is to say between respective rails. A second electrical power generator 15 again driven by a turbine 16 provides electrical current to the arrangement 14 through an electrical current controller 16.

The turbines 12, 16 may be the same prime mover or different turbines or engines within an arrangement. In any event, a number of electrical power generators 11, 15 are provided with only one generator 11 operating with voltage control whilst the other generators 15 operate with electrical current control.

When an electrical load (17), whether that be for control of the turbines 12, 16 or actuators for other features is applied to the arrangement 14 it will be appreciated that electrical current will be provided to the load 17. If this load 17 is significant then there may be a transient reduction in voltage V which will be accommodated by reconfiguration of the generator 11. It will be appreciated that a number of loads 17 will be associated with the arrangement 14 and in such circumstances the load applied to that arrangement 14 may vary. It will also be appreciated that the load may actually contribute electrical current by regeneration processes. If the load is sufficiently great or there is rapid switching of loads into or out of association with the arrangement 14 it will be appreciated that the response capability of the voltage controller 13 and its associated generator 11 may be inadequate to achieve desirable correction or adjustment in the desired value of voltage V to remain within acceptable margins.

Figure 2:
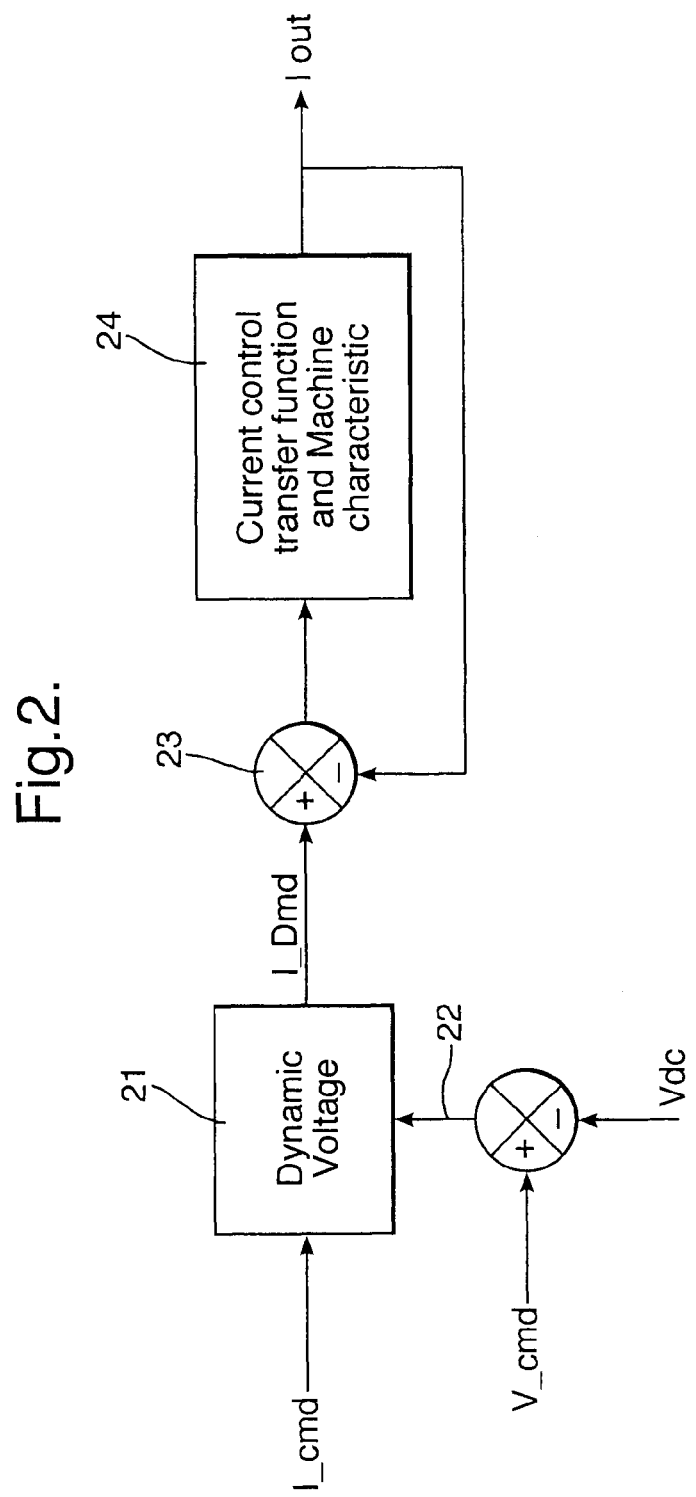
FIG. 2 is a schematic illustration of an electrical current generator.

In accordance with aspects of the present invention a dynamic voltage support function is provided through utilisation of the electrical current controller 16 utilised with regard to generator 15. FIG. 2 provides a schematic illustration of dynamic voltage control of the electrical current controller in accordance with aspects of the present invention. In such circumstances as can be seen electrical current command I_cmd is presented to another electrical current controller 21. The controller 21 also receives an indication of operational voltage margin 22 determined by a comparison of the desired voltage V_cmd and an operational voltage Vdc determined by a voltage sensor positioned between the rails of the arrangement 14 (FIG. 1). In such circumstances the controller 21 will act dependent upon the operational voltage margin 22 as indicted. The controller 21 in such circumstances will provide a necessary electrical current demand I_Dmd to provide support for the desired voltage within the electrical distribution system.

In normal operation it will be appreciated that V_cmd and Vdc will be substantially the same and therefore there will be no operational margin and therefore the controller 21 will act in accordance with previous arrangements, that is to say the electrical current maintenance will result in the electrical current demand I_Dmd presented will be substantially the same as I_cmd for the conventional electrical current controller as described above with regard to controller 16. However, where the operational voltage margin 22 exceeds a predetermined value then the controller 21 will act to reconfigure its associated electrical power generator in order to increase the electrical current to I_Dmd and, as such, the input to the electrical power distribution system.

The desired electrical voltage value may be in the order to 540V for example and therefore if the operational voltage determined by the voltage sensor is also 540V then clearly the system is stable and operating in accordance with acceptable function. In such a steady state the operational voltage margin will be zero, that is to say the voltage error will be zero and the electrical current demand I_Dmd in such circumstances will equal the input electrical current command I_cmd. Thus the system operates in accordance with prior known normal constant electrical current control regimes.

Under dynamic conditions the operational voltage margin 22 may become large such that a controller 21 as indcted reconfigures its associated electrical generator in order to target electrical current demand, that is to say to add or subtract electrical current in part to support the overall electrical distribution system and therefore stabilise the electrical distribution system by slowing down any rate of change with regard to operational voltage margin or error. In effect additional electrical current is provided to support the voltage control stabilisation regime with respect to the first electrical power generator and its associated voltage controller. As the electrical distribution system stabilises it will be appreciated that the operational voltage margin or Vcmd to Vdc difference will narrow resulting in the electrical current demand I_Dmd provided and required through the second electrical power generator and its associated electrical current controller being reduced until equilibrium is again achieved between I_cmd and I_Dmd so returning the electrical current control of the second electrical power generator to its normal electrical current control state.

Figure 5:
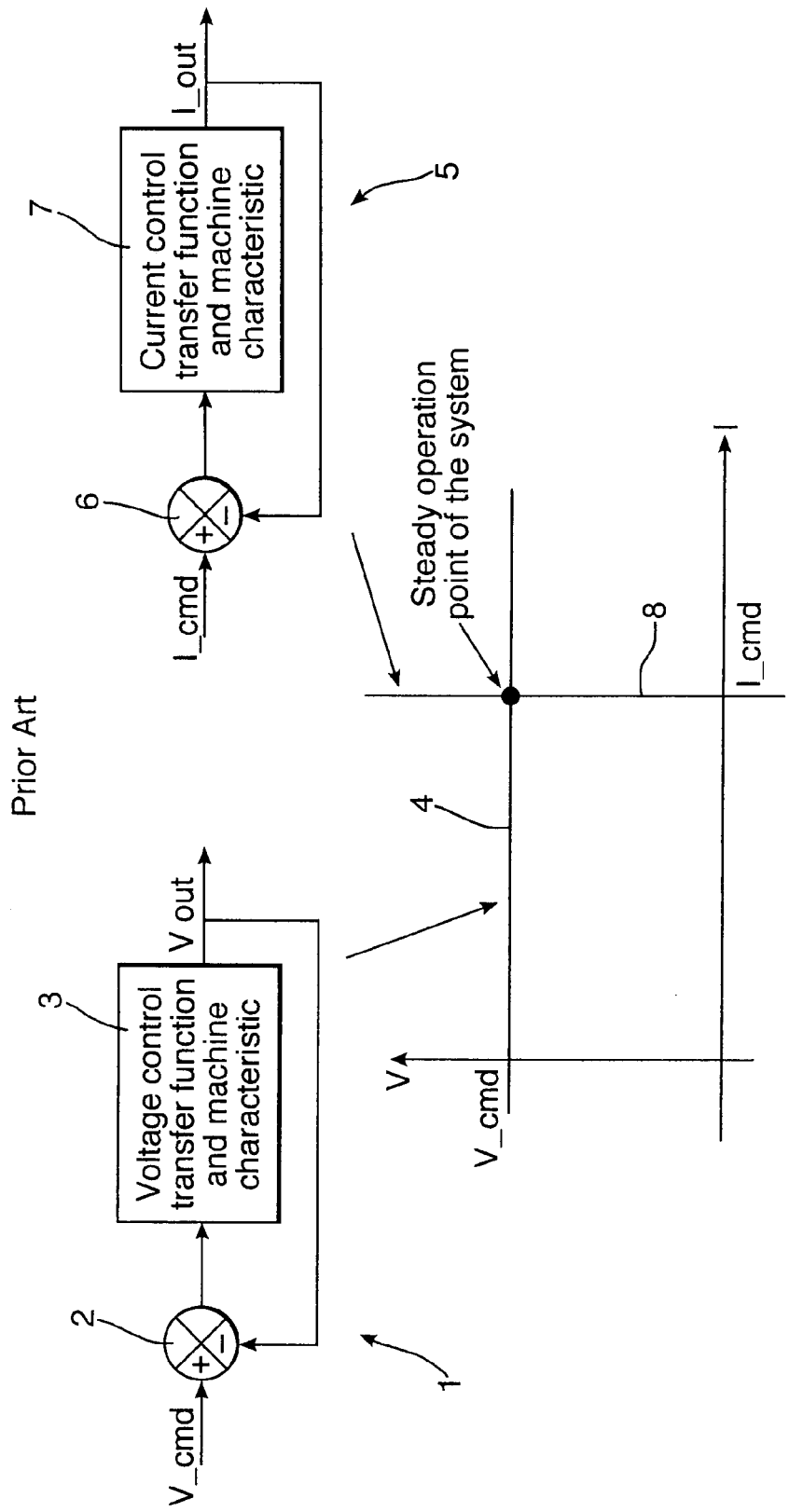
FIG. 5 is a graphic illustration of the prior art.

In FIG. 2 as can be seen the electrical current demand I_Dmd is presented to a controller 23 which acts in a similar fashion to that as described above with regard to controller 6 in FIG. 5 to compare the electrical current output Iout to the electrical current input to the controller 23. As indicated this electrical current input is designated I_Dmd but when the operational voltage margin is zero or below a threshold value the electrical current demand I_Dmd equals steady state electrical current command I_cmd and therefore the system operates in accordance with previous practice. The electrical current in such circumstances enters the electrical distribution system and in such circumstances a generator 24 is configured such that Iout equals I_cmd. If there is an operational voltage margin 22 greater than or equal to the threshold as indicated above then the controller 21 will designate a necessary electrical current demand I_Dmd which again through the controller 23 will act upon the electrical power generator 24 to ensure that the electrical current output (Iout) provided by the appropriately configured electrical current generator 24 is at the necessary current I_Dmd to provide support for the voltage maintenance objectives of the first electrical power generator with its associated voltage controller. The additional electrical current provided by the second electrical generator in terms of the electrical current Iout will as indicated above act to supplement the effects of the voltage control on the first electrical power generator such that gradually the necessary additional electrical current will reduce as the voltage returns to a stable level at a desired voltage value.

Figure 3:
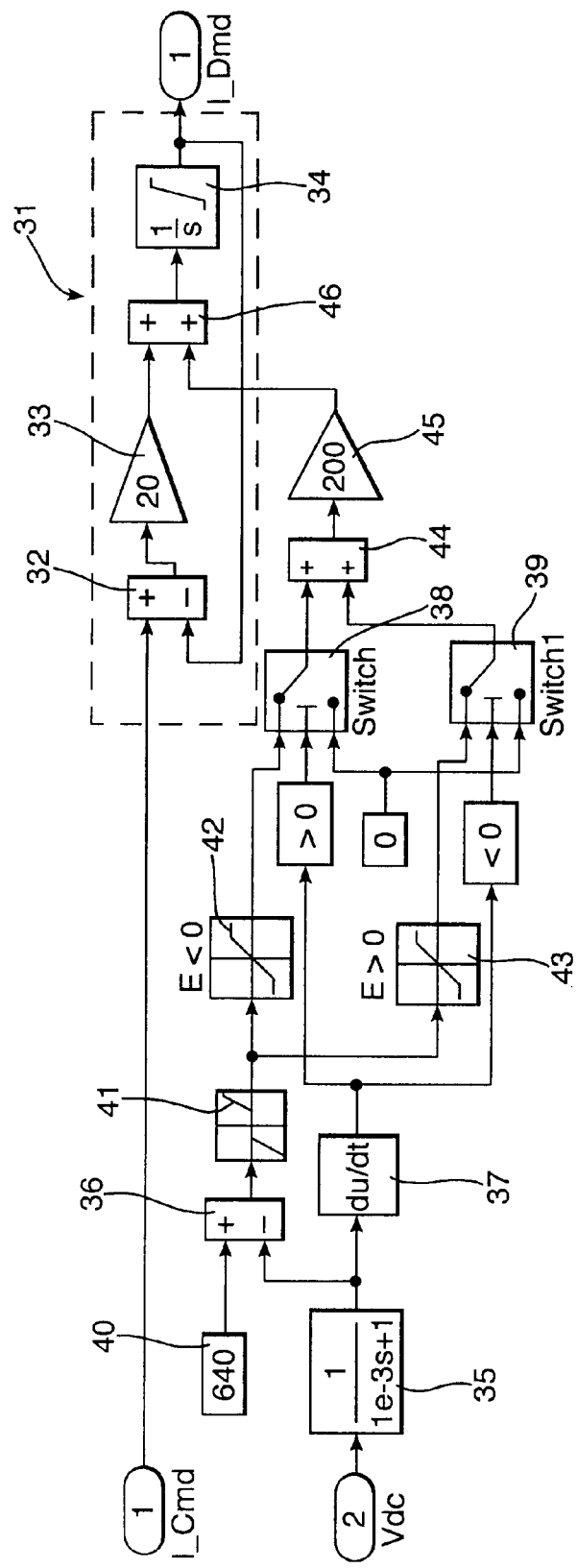
FIG. 3 is a schematic illustration of a control arrangement in accordance with aspects of the present invention.

The electrical current controller in accordance with aspects of the present invention acts upon the basis of an integrator as depicted in FIG. 3. In such circumstances the input to the integrator is defined as the operational voltage margin or error between the desired electrical current demand I_Dmd and the targeted electrical current command I_cmd in order to supplement the voltage control. This voltage margin is output from the controller in order to reconfigure as indicated the second electrical power generator to provide the desired electrical current additionally above that for the stable electrical current operation. In steady state operation it will be appreciated that the electrical current demands will generally be integrated to zero so that the associated second electrical generator will operate with the electrical current control output and the desired electrical current for steady state operation.

In accordance with aspects of the present invention the input to the integrator electrical current controller is also superimposed by a voltage error or margin proportional to the voltage error between the desired voltage for the electrical distribution system and the actually determined electrical voltage system found through a voltage sensor across the electrical power distribution system. In such circumstances the output from the electrical current controller provides a necessary target electrical current demand which can be boosted either up or down dynamically by the respective operational voltage margin or errors. In such an arrangement the electrical current controller acts as a slave to the voltage controller.

As illustrated in FIG. 2 in normal operation the electrical current command I_cmd is presented to the controller depicted by broken line box 31. Thus, as previously this electrical current command I_cmd is compared with the electrical current of the system with a comparator 32 which then acts through an appropriate gain 33 and integrator 34 to maintain the desired electrical demand I_Dmd. As indicated with the voltage within an acceptable threshold range I_cmd will be maintained by the electrical current controller 31 such that I_Dmd output from the controller is the same as I_cmd.

With regard to the voltage controller for the first electrical power generator voltage demand Vdc first is appropriately filtered through a filter 35 and then the signal is used in a comparator 36 to compare the operational voltage Vdc with the desired voltage, for example as illustrated at 540V. The determined operational voltage after filtering at filter 35 is also presented to a signal differentiator 37 such that a logic integrator can be created through respective paths to switches 38, 39 based on the rate of change of Vdc.

A comparator 36 for operational voltage Vdc to determine whether it is substantially equivalent to the desired voltage 40 is used and if equivalent then a zero value is presented to a band filter 41. The band filter 41 presents signals dependent upon the differentials provided by the comparator 36 to respective signal limiters 42, 43. With respect to signal limiter 42 it will be noted that the differential between the operational voltage Vdc and the desired voltage 40 is such that the operational voltage is greater than expected. With respect to the signal limiter 43 the converse is true in that the operational voltage determined by the voltage sensor is lower than the desired voltage 40. The respective signal limiters 42, 43 in such circumstances provide input signals to switches 38, 39 respectively. Other switch 38, 39 inputs are provided by the signal differentiator 37 which receives the operational voltage value after appropriate filtering by filter 35 to determined whether the voltage is increasing or decreasing relative to the desired voltage value.

The switches 38, 39 provide respective inputs to a summation block 44 which then provides a signal to an amplifier 45 which in turn provides an electrical signal to a summation block 46 within the integrated current controller 31 as described above. The effect in such circumstances will be to provide a signal to the integrator 34 resulting in additional electrical current being provided which comprises the base electrical current plus or minus the necessary electrical current to maintain and stabilise the electric distribution system to achieve a desired voltage value or marginal level.

It will be appreciated that an effective threshold must be provided prior to triggering of the current control of the second electrical power generator in accordance with aspects of the present invention. Such a threshold level is required to avoid continuous utilisation of the electrical current controller rather than the voltage controller of the first electrical power generator in accordance with previous practice. It will be appreciated that the first electrical power generator with its appropriate voltage control will have a system designed level of capability with regard to stabilising voltage within the electrical power distribution system. Utilisation of a slave electrical current control for second electrical power generators is used for dynamic support rather than continuous control.

In such circumstances generally to avoid unnecessary control action typically a threshold of at least 5V is utilised through a dead band filter 41 as described above. In such circumstances the electrical current demand can be boosted upwards only if the voltage is 5V lower than the rated or desired electrical voltage value and is still dropping, that is to say dv/dt is less than zero. The electrical current demand can be boosted downwards only if the voltage is 5V higher than the desired or rated electrical voltage and that the operational voltage is still rising, that is to say dv/dt is greater than zero. In such circumstances in accordance with aspects of the present invention the controller only contributes positively to reducing dynamic voltage errors and does not try to fight and is not in conflict with the voltage controller for the first electrical power generator. By providing the principal and supplemental or master and slave approach with regard to initially the voltage controller providing stability and then that control only being supplemented when required a more robust control arrangement is provided which is more dynamically desirable than previous constant target electrical current control arrangements.

Typically, once a voltage dynamic, that is to say instability is passed there will be some residual electrical current demand. This dynamic error in the electrical current demands will be corrected by the integrator 34 as described above but at a much slower rate than with respect to the boosting rate for the dynamic voltage errors and therefore will not result in additional voltage dynamics. Furthermore as the integrator 34 is part of the electrical current controller it will give a response which is a step change in a lagged manner. However such an approach also carries a benefit with regard to system dynamics in that such system dynamics can be avoided when a step change demand in electrical current demand is issued by an electrical current controller in accordance with aspects of the present invention.

Figure 4:
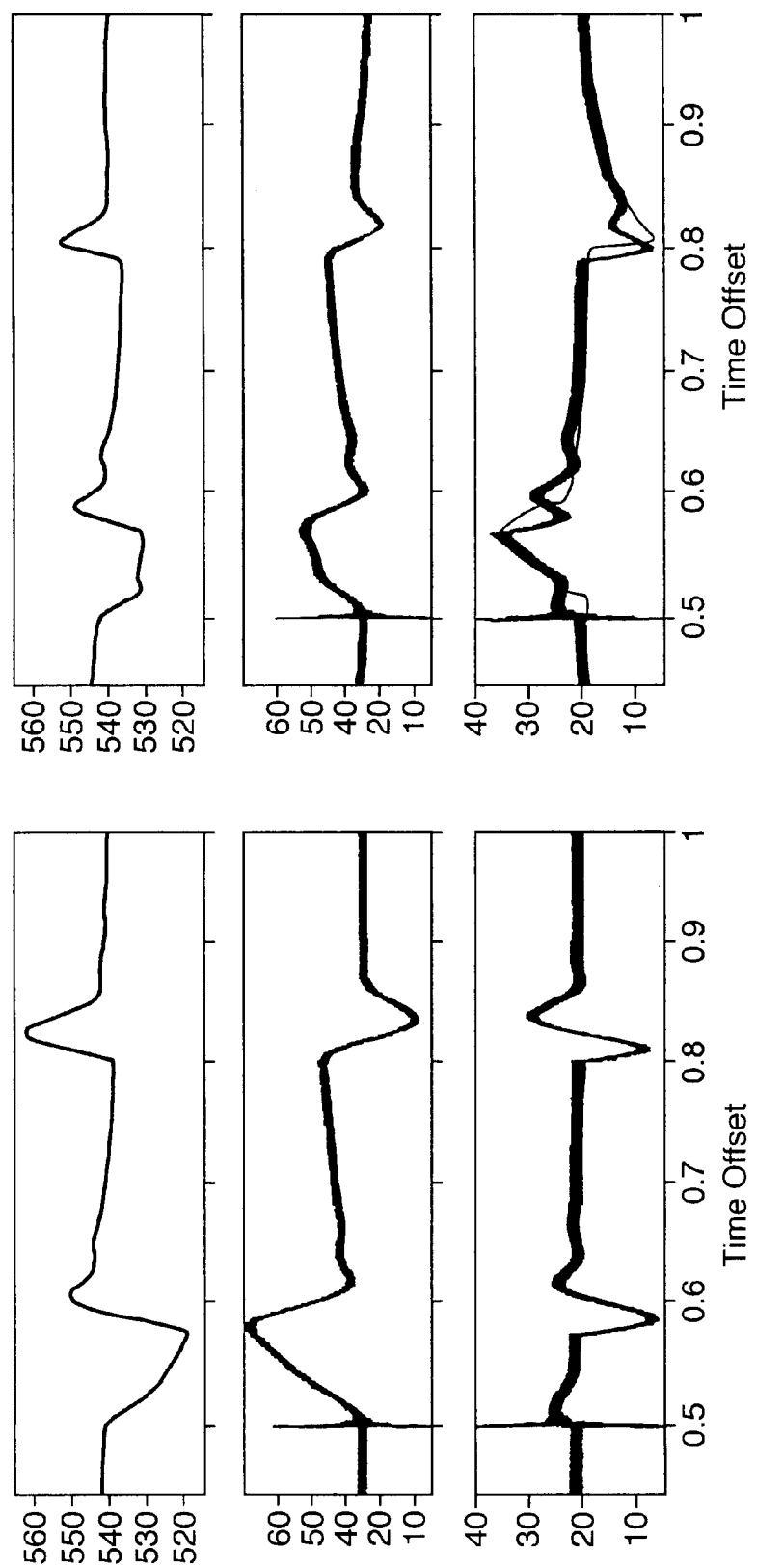
FIG. 4 is a graphic illustration of expected voltage and current responses in respect of a prior system and a system operating in accordance with aspects of the present invention.

In terms of operation and utilising two electrical power generators respectively regulated at 70 kW for the voltage controlled generator and 30 kW for the current controlled generator it can be shown that with a system voltage rated at 540V greater control can be achieved with a voltage variation which is controlled within ±5%. When a 20 kW dynamic load is switched on to such a system it will cause the system voltage to drop before the voltage controlled generator can react to bring it back to its normal level. When such a relatively high electrical load is switched off the system voltage rises higher than the voltage controlled generator can react to reduce this to a normal level. FIG. 4 provides graphic illustrations of the respective system voltage responses (FIG. 4a), current from the generator controlling the voltage (FIG. 4b) and current from the generator under current control (FIG. 4c). The left hand trace shows system dynamics without a dynamic voltage boosting feature for electrical current control of the second generator in accordance with aspects of the present invention. In such circumstances as can be seen the system voltage drops below 520V and rises above 560V respectively during dynamic switching of the load as described above. The traces depicted on the right hand side of FIG. 4 show the results of the same operational conditions with a dynamic boosting electrical current control of the second generator in accordance with aspects of the present invention. As can be seen the transient voltage has reduced by more than 10V by introducing the additional electrical current in accordance with aspects of the present invention.

Further advantages are provided with regard to aspects of the present invention are that the dynamic voltage boosting achieved by the additional electrical current provided in accordance with aspects of the present invention provides an over voltage protection function which is built in automatically to the electrical power distribution arrangement. In such circumstances should parallel operation with regard to the respective generators be broken the voltage boosting function with respect to the electrical current controller will boost the electrical current demand to the right level and maintain the system voltage to the edge of the voltage dead band set for activation of this function as described above. Additionally, such an approach avoids occurrence of under voltages should the load level be higher than the electrical current demand assuming that the reserve power rating for the second electrical generator is sufficient to cover the load demand requirements.

In the above circumstances it will be appreciated that normal electrical current control can be maintained regardless of changes to the electrical power distribution system or arrangement. In such circumstances, whether in over voltage or under voltage protection activation, supply of electrical current for the second generators can continue whereas previously such generators would be shut down unless the voltage controller is switched in to take over electrical current control.

With regard to voltage boosting electrical current control the electrical current demand is boosted to levels required in order to maintain a voltage within normal operational ranges for the electrical distribution system. This will enable an electrical distribution system to remain operational without interruptions. Typically the voltage control by the first electrical generator under voltage control will be relatively highly oscillatory with generally high levels of overshoot. If gains from such a voltage controller are not tuned properly then the system may become unstable. By comparison in accordance with aspects of the present invention the voltage control level in the electrical distribution and generation system is controlled by utilisation of electrical current controllers in accordance with aspects of the present invention. In such circumstances the system is more stable with only a small overshoot resulting in a more stable control technique than prior normal voltage control regimes.

Aspects of the present invention mean that voltage support to an electrical power generation system is achieved through dynamic control and utilising electrical current control of second electrical power generators. Such an approach will not cause control instability resulting in conflicts and fighting between the respective voltage controlled generator and the electrical current controlled generators as is potentially a problem with prior electrical generator systems. Aspects of the present invention also allow provision of an electrical generation system in which over voltage or under voltage conditions can be eliminated where electrical generation system connections are lost, that is to say generators break parallel connection to the electrical distribution arrangement.

Aspects of the present invention may be utilised with regard to a wide range of electrical power distribution networks where it is likely that the generators will operate in parallel and with some electrical generators operating under electrical current control. As illustrated above this may have particular applicability with regard to electrical power generators utilised in aircraft through electrical generators associated with gas turbines although other electrical distribution systems may also be utilised.

Typically, there will be a common operational margin threshold of which electrical current control in accordance with aspects of the present invention will become operational. However, in systems which require more flexibility different thresholds may be active for different generators or at different operational states.

We claim:

1. A method of operating an electrical generator system comprising a first electrical generator, a voltage controller, a second electrical generator, a current controller and a common electrical power distribution arrangement, the first electrical generator and the second electrical generator being coupled to the common electrical power distribution arrangement, the method comprising:
   a) determining an operational voltage value for the common electrical power distribution arrangement;
   b) comparing the operational voltage value with a desired voltage value to determine an operational voltage margin;
   c) using the voltage controller to configure the first electrical generator to provide and substantially maintain the desired voltage value within the common electrical power distribution arrangement; and,
   d) comparing the operational voltage margin with a predetermined voltage margin whereby if the operational voltage margin exceeds the predetermined voltage margin then the current controller for the second electrical generator providing additional electrical current to the common electrical power distribution arrangement.

2. A method as claimed in claim 1 wherein the predetermined voltage margin is adjustable.

3. A method as claimed in claim 1 wherein there are a plurality of predetermined voltage margins to alter the additional electrical current provided by the second generator.

4. A method as claimed in claim 1 wherein additional electrical current is gradually altered until the operational voltage substantially equals the desired voltage.

5. A method as claimed in claim 1 wherein there are a plurality of second electrical generators principally controlled by a respective current controller with each current controller associated with a voltage sensor.

6. A method as claimed in claim 1 wherein the method includes determining if the operational voltage margin is increasing or decreasing when greater than the pre-determined voltage margin.

7. An electrical generator system comprising a first electrical generator, a voltage controller, a second electrical generator, a current controller and a common electrical power distribution arrangement, the first electrical generator and the second electrical generator being coupled to the common electrical power distribution arrangement, the first electrical generator being associated with the voltage controller, a voltage sensor to determine a voltage across the common electrical power distribution arrangement and to provide an operational voltage value, a comparator to compare the operational voltage value with a desired voltage value to determine an operational voltage margin, the voltage controller configuring the first electrical generator to provide and maintain a desired voltage value within the common electrical power distribution arrangement, the second electrical generator associated with the current controller to maintain a desired electrical current value within the common electrical power distribution arrangement, a second comparator to compare the operational voltage margin with a predetermined voltage margin whereby if the second comparator determines that the operational voltage margin exceeds the predetermined voltage margin then the current controller for the second electrical generator being arranged to provide additional electrical current to the common electrical power distribution arrangement.

8. A system as claimed in claim 7 wherein the predetermined voltage margin is adjustable.

9. A system as claimed in claim 7 wherein there are a plurality of predetermined voltage margins to alter the additional electrical current provided by the second generator.

10. A system as claimed in claim 7 wherein additional electrical current is gradually altered, either increased or decreased until the operational voltage substantially equals the desired voltage.

11. A system as claimed in claim 7 wherein there are a plurality of second electrical generators principally controlled by a respective current controller with each current controller associated with the voltage sensor.

12. A system as claimed in claim 7 wherein the current controller includes means to determine whether the operational voltage margin is increasing or decreasing.

13. A gas turbine engine incorporating an electrical generator system as claimed in claim 7.

14. An aircraft incorporating an electrical generator system as claimed in claim 7.

* * * * *